(12) United States Patent
Igarashi

(10) Patent No.: US 11,933,629 B2
(45) Date of Patent: Mar. 19, 2024

(54) MAP DATA UPDATING DEVICE AND STORAGE MEDIUM STORING COMPUTER PROGRAM FOR MAP DATA UPDATING

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 17/192,995

(22) Filed: Mar. 5, 2021

(65) Prior Publication Data
US 2021/0278241 A1  Sep. 9, 2021

(30) Foreign Application Priority Data
Mar. 9, 2020 (JP) ................................ 2020-040017

(51) Int. Cl.
*G01C 21/00* (2006.01)
*G06F 16/23* (2019.01)
*G06F 16/29* (2019.01)

(52) U.S. Cl.
CPC ..... *G01C 21/3815* (2020.08); *G01C 21/3889* (2020.08); *G06F 16/2379* (2019.01); *G06F 16/29* (2019.01)

(58) Field of Classification Search
CPC ......................... G01C 21/3859; G01C 21/3889
See application file for complete search history.

(56) References Cited

U.S. PATENT DOCUMENTS

| | | | |
|---|---|---|---|
| 2007/0143014 A1* | 6/2007 | Sekine | G01C 21/3859 701/431 |
| 2008/0082255 A1 | 4/2008 | Takahata et al. | |
| 2014/0058661 A1* | 2/2014 | Choi | G09B 29/106 701/428 |
| 2019/0096253 A1* | 3/2019 | Stenneth | G08G 1/143 |
| 2021/0108926 A1* | 4/2021 | Tran | G06T 17/05 |
| 2021/0140782 A1 | 5/2021 | Ootsuji et al. | |
| 2021/0341940 A1* | 11/2021 | Baik | G05D 1/0274 |
| 2021/0406559 A1* | 12/2021 | Efland | G06V 10/803 |

FOREIGN PATENT DOCUMENTS

| | | |
|---|---|---|
| JP | 2008089375 A | 4/2008 |
| JP | 2010-003172 A | 1/2010 |
| JP | 2010127768 A | 6/2010 |

(Continued)

*Primary Examiner* — Peter D Nolan
*Assistant Examiner* — Jacob Kent Besteman-Street
(74) *Attorney, Agent, or Firm* — Dickinson Wright, PLLC

(57) ABSTRACT

A map data updating device comprises a communication unit, a memory, and a processor configured to store map data, received from a server through the communication unit before the vehicle has begun to travel, in the memory as initial map data, and to send a request to the server through the communication unit for update information representing information updated from the initial map data for each of a plurality of road zones within the scheduled route, from among the information associated with the road zones in the map data updated at the server, and to use the update information received through the communication unit to update the initial map data, after the vehicle has begun to travel along the scheduled route.

5 Claims, 13 Drawing Sheets

(56) References Cited

FOREIGN PATENT DOCUMENTS

| | | | |
|---|---|---|---|
| JP | 2011163951 | A | 8/2011 |
| JP | 2014503834 | A | 2/2014 |
| JP | 2016-125952 | A | 7/2016 |
| JP | 2019-087847 | A | 6/2019 |
| WO | 2019/087464 | A1 | 5/2019 |
| WO | 2019/188165 | A1 | 10/2019 |

\* cited by examiner

MAP DATA UPDATING DEVICE AND STORAGE MEDIUM STORING COMPUTER PROGRAM FOR MAP DATA UPDATING

FIELD

The present invention relates to a map data updating device, and to a storage medium storing a computer program for map data updating.

BACKGROUND

High-precision road map data that is to be referred to for automatic control of a vehicle by a vehicle self-driving system must accurately represent its road-associated information. The road-associated information includes information relating to lane marking line locations representing the boundaries between traffic lanes, and to traffic regulations, but since navigatable traffic lanes vary depending on the traffic regulations, it is desirable for the map data used by the vehicle self-driving system to be constantly kept in an updated state.

For example, the server that manages the map data appropriately collects road-associated information and uses the collected information to update the map data. The vehicle self-driving system receives the updated map data from the server and automatically controls running of the vehicle using the map data.

Japanese Patent Public Inspection No. 2014-503834, for example, proposes a real-time map data updating system comprising a service device that stores map data including one or more items of physical level data representing a specific region on one or more scales, one or more items of tile data showing a specific region demarcated into constant sizes, and one or more items of layer data displaying in a separately demarcated manner the information represented in a single map, and provides the map data in one or more units from among level, layer and tile units from a terminal device at the time the update is requested, and a terminal device that carries out a route guide function based on built-in map data, uses the update conditions to determine the portion of the built-in map data to be updated, in level, layer and tile units, makes a request to the service device, receives the determined partial map data and reflects it in the built-in map data.

SUMMARY

Because map data used by a vehicle self-driving system includes a large amount of road-associated information, reception of the map data from the server by the vehicle incurs a high communication load.

In the real-time map data updating system proposed in Japanese Patent Public Inspection No. 2014-503834, the amount of updated information is reduced depending on the update conditions. However, the communication load may not be adequately reduced, depending on the update conditions.

It is therefore an object of the present invention to provide a map data updating device that can update map data to a new state in relation to a scheduled route, while also reducing the communication load.

According to one embodiment of the invention there is provided a map data updating device. The map data updating device has a communication unit; a memory; and a processor configured to store map data received from a server through the communication unit before the vehicle has begun to travel in the memory as initial map data, to send a request to the server through the communication unit for update information representing information updated from the initial map data for each of a plurality of road zones within the scheduled route, from among the information associated with the road zones in the map data updated at the server, after the vehicle has begun to travel along the scheduled route, and to use the updated information received through the communication unit to update the initial map data.

In this map data updating device, preferably the map data has first map data which information is updated at the server at a first update cycle and second map data which information is updated at the server at a second update cycle that is shorter than the first update cycle, and the processor is configured to send a request to the server through the communication unit for the update information of the first map data associated with the road zone before requesting for the update information of the second map data for each of a plurality of road zones within the scheduled route, before the vehicle has reached the road zone.

Moreover, in this map data updating device, preferably the map data has basic data and update data which has updated information with respect to the basic data, and the processor is configured to update the initial map data using the update information that represents the information updated from the initial map data, among the information associated with the road zone in the update data that has been updated at the server, for the road zone for which the update information has been requested among each of a plurality of road zones within the scheduled route.

In the map data updating device, preferably each of the items of information of the map data is associated with an updating date/time at which the information was updated, the processor is configured to store the send date/time at which the server sent the map data to the vehicle, as the send date/time for the initial map data, in the memory together with the initial map data, and the processor is configured to send the send date/time for the initial map data to the server through the communication unit, together with the request for the update information, and the processor is configured to update the initial map data using the update information containing information updated after the send date/time for the initial map data, among the information associated with the road zone of the map data that has been updated at the server, for the road zone for which update information was requested, among each of a plurality of road zones within the scheduled route.

According to another embodiment there is provided a computer-readable non-transitory storage medium which stores a computer program for map data updating. The computer program for map data updating causes a processor to store map data received from a server through the communication unit before the vehicle has begun to travel in the memory as initial map data, to send a request to the server through the communication unit for update information representing information updated from the initial map data for each of a plurality of road zones within the scheduled route, from among the information associated with the road zones in the map data updated at the server, after the vehicle has begun to travel along the scheduled route, and to use the updated information received through the communication unit to update the initial map data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The map data updating device of this embodiment will now be explained with reference to the accompanying drawings. The map data updating device stores map data received from the server before the vehicle has begun to travel as initial map data, and after the vehicle has begun to travel along the scheduled route, for each of the plurality of road zones within the scheduled route, it sends to the server a request for update information representing information that has been updated from the initial map data, among the information associated with the road zones in the map data updated at the server. The map data updating device then updates the initial map data using the received update information. This allows the map data associated with the scheduled route to be brought to the new updated state while reducing the communication load.

Figure 1:
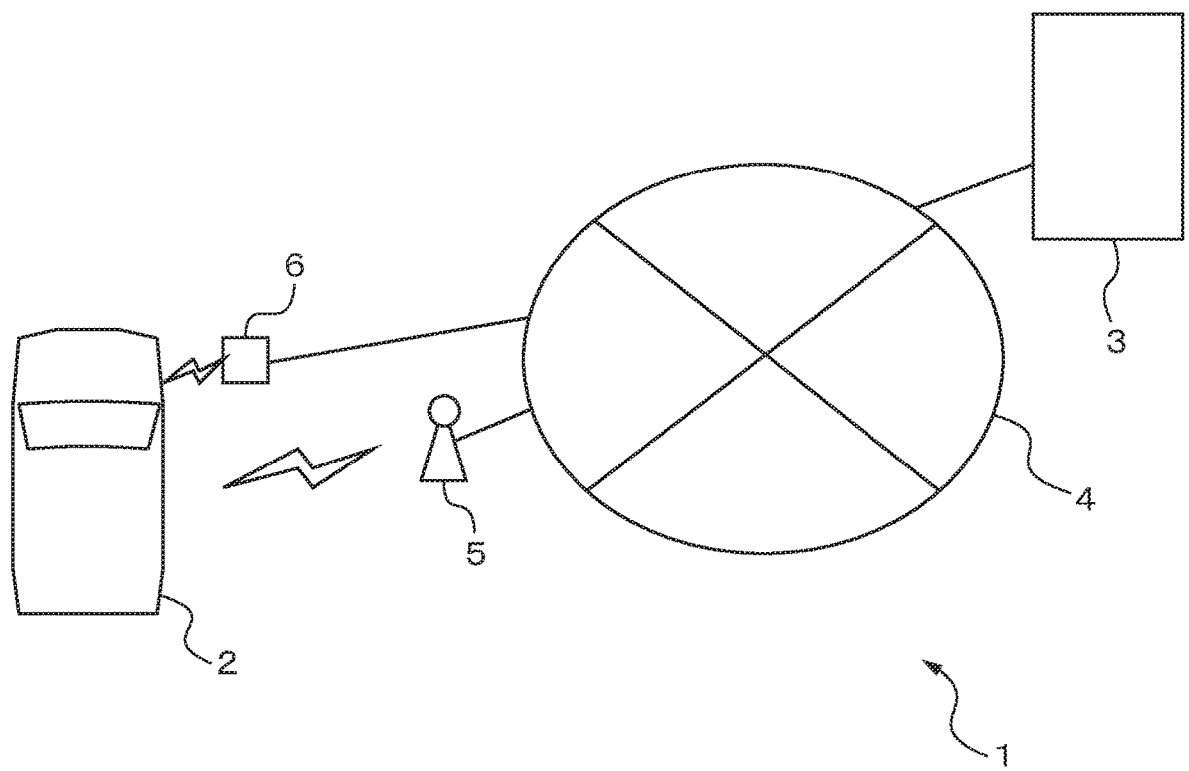
FIG. 1 is a general schematic drawing of a map data updating system in which a map data updating device is installed.

FIG. 1 is a general schematic drawing of a map data updating system in which a map data updating device is installed. For this embodiment, the map data updating system 1 comprises at least a vehicle 2 in which the map data updating device is installed, and a server 3. For example, by accessing a wireless base station 5 (hereunder also known as a macrocell base station 5) which provides macrocells connected with the server 3 via a communication network 4 and gateway (not shown), the vehicle 2 is placed in connection with the server 3 via the macrocell base station 5 and communication network 4. When the vehicle 2 is parked in the user's private parking spot, for example, the vehicle 2 uses wireless communication or wired communication to access a wireless base station 6 (hereunder also known as a small cell base station 6) which provides small cells connected with the server 3 via a communication network 4 and gateway (not shown), to be in connection with the server 3 via the small cell base station 6 and communication network 4. Although only one vehicle 2 is depicted in FIG. 1, the map data updating system 1 may have more than one vehicle 2. Likewise, more than one macrocell base station 5 or small cell base station 6 may be connected to the communication network 4.

Figure 2:
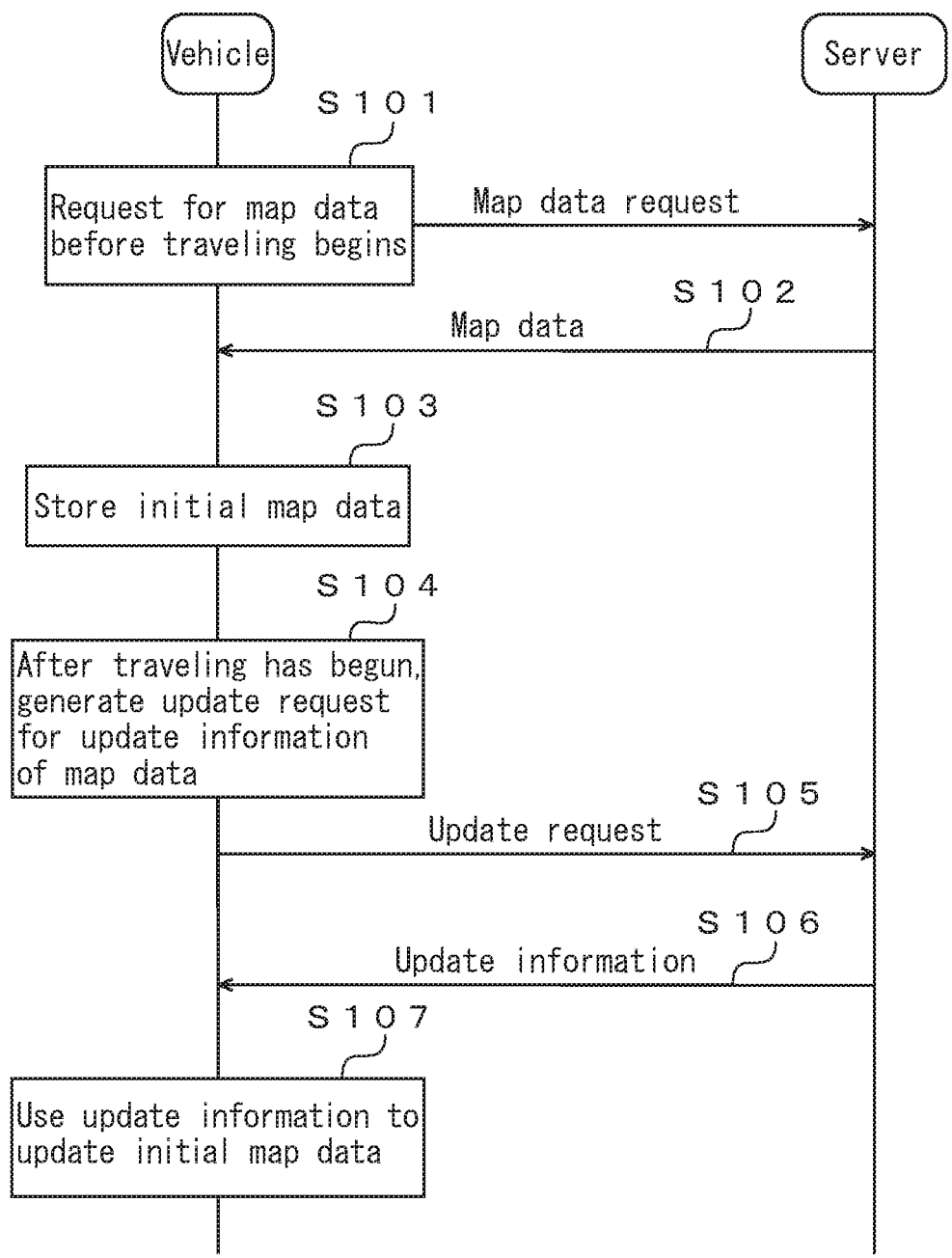
FIG. 2 is a sequence diagram for map data update processing.

FIG. 2 is a sequence diagram for map data update processing. The map data updating system 1 may carry out the map data update processing according to the sequence diagram shown in FIG. 2, both before the vehicle 2 has begun to travel and after the vehicle has begun to travel along the scheduled route.

Before the vehicle 2 has begun to travel, it sends a map data request for sending of map data, to the server 3 via the small cell base station 6 and communication network 4 (step S101). Before the vehicle 2 has begun to travel, it sends the map data request to the server 3 at the user's private parking spot as the point of departure, for example.

The server 3 stores map data and updates map data. The map data is high-precision road-associated map information that is to be used to control traveling of the vehicle 2. Specifically, the map data contains the locations and types of road features (such as lane marking lines, stop lines, speed indicators and other road markings, road signs or traffic lights) that define the traveling conditions for each road represented on the map. The map data may also contain information related to traffic regulations, information related to accidents, information related to other vehicles or pedestrians, and information related to signals. Each of the road features in the map data are associated with a traffic lane ID, as identifying information for identification of the traffic lane on the road. The traffic lane ID is associated with a road zone ID as identifying information for identification of the road zone. When one road zone has multiple traffic lanes, the multiple traffic lane IDs are associated with that road zone ID. Each of the road features of the map data is associated with the road zone ID through the traffic lane ID. The scheduled route from the current location of the vehicle 2 to the destination is generated as a linkage of the road zones on which the vehicle 2 will travel from the current location to the destination. As with the road features, the information related to traffic regulations, information related to accidents, information related to other vehicles or pedestrians and information related to signals, that are contained in the map data, are associated with a traffic lane ID, and are associated with a road zone ID through the traffic lane ID. The region represented by the map data may be a region including a country or multiple prefectures. When the vehicle 2 sends a map data request, it may communicate with the server 3 through the macrocell base station 5 and communication network 4, but since the small cell base station 6 only communicates with a relatively small number of targets including the vehicle 2, the vehicle 2 preferably communicates with the server 3 through the small cell base station 6 and communication network 4 from the viewpoint of allowing rapid and inexpensive communication using high-capacity communication lines.

Figure 3:
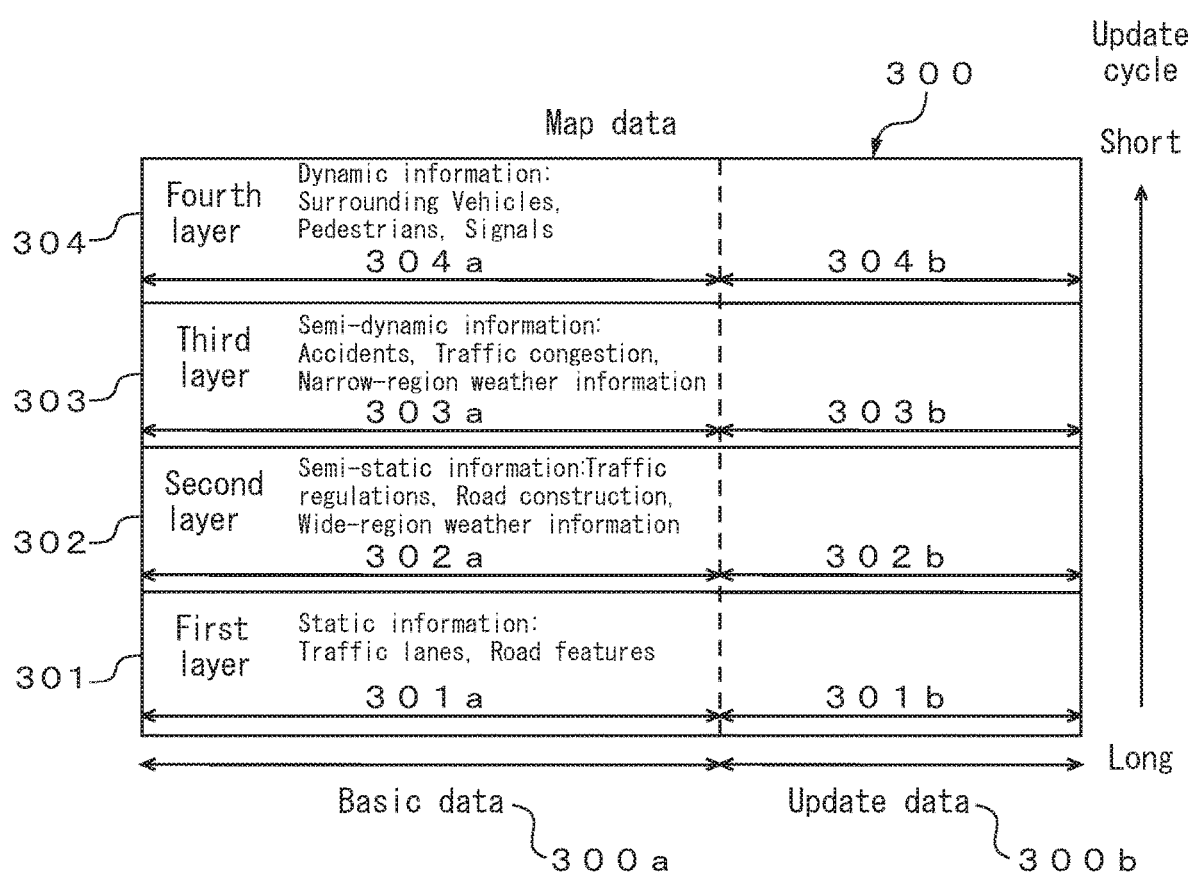
FIG. 3 is a diagram illustrating map data.

FIG. 3 is a diagram illustrating map data. The map data 300 has a hierarchical structure. Specifically, the map data 300 includes a first layer 301 containing static information, a second layer 302 containing semi-static information, a third layer 303 containing semi-dynamic information and a fourth layer 304 containing dynamic information. The first layer 301 is an example of first map data, in which case the second layer 302, third layer 303 and fourth layer 304 are examples of second map data. The server 3 appropriately collects road-related information and updates the information in each layer of the map data. The server 3 varies the update cycle for each layer according to the degree of time-dependent change in the information of each layer. The update cycle is shorter in the order: first layer 301, second layer 302, third layer 303, fourth layer 304. The static information in the first layer 301 includes information relating to essentially non-changing entities, including information relating to outside features such as road markings or road signs, and information resulting to traffic lanes. Therefore, the static information in the first layer 301 may be updated with a relatively long cycle (such as 1 hour to 1 month). The semi-static information in the second layer 302 includes information relating to conditions that continue for certain periods but can potentially vary in a shorter time period than static information, such as information relating to traffic regulations, information relating to road construction and wide-area weather information. Therefore, the semi-static information in the second layer 302 may be updated with a shorter cycle than the update cycle of the static information in the first layer 301 (such as 30 minutes to 1 hour). The semi-dynamic information in the third layer 303 includes information relating to conditions that can potentially vary in a shorter time period than semi-static information, such as information relating to accidents, information relating to traffic congestion and narrow-region weather information. Therefore, the semi-dynamic information in the third layer 303 may be updated with a shorter cycle than the update cycle of the semi-static information in the second layer 302 (such as 1 minute to 30 minutes). Finally, the dynamic information in the fourth layer 304 includes information relating to conditions that can potentially change in real time, such as information relating to the location of the vehicle and the location of pedestrians, and information relating to signals. The dynamic information in the fourth layer 304 is therefore updated in real time, for example.

The map data 300 comprises basic data 300a, and update data 300b containing information updated from the basic data 300a. Specifically, the first layer 301 comprises basic data 301a in the first layer 301, and update data 301b containing information updated from the basic data 301a. The second layer 302 comprises basic data 302a in the second layer 302, and update data 302b containing information updated from the basic data 302a. The third layer 303 comprises basic data 303a in the third layer 303, and update data 303b containing information updated from the basic data 303a. The fourth layer 304 comprises basic data 304a in the fourth layer 304, and update data 304b containing information updated from the basic data 304a.

When the server 3 receives a map data send request, it produces new map data combining the basic data 300a and update data 300b, as the current map data 300, and sends the map data to the vehicle 2 through the communication network 4 and small cell base station 6 (step S102).

The vehicle 2 stores the received map data as initial map data, before it has begun traveling (step S103). After the vehicle 2 has begun to travel along the scheduled route generated by its navigation device, for each of the plurality of road zones within the scheduled route, the vehicle 2 generates an update request that requests update information representing information that has been updated from the initial map data, among the information associated with the road zones in the map data updated at the server 3 (step S104). The vehicle 2 sends the update request to the server 3 through the macrocell base station 5 and communication network 4 (step S105). The information associated with the initial traveling road zone when the vehicle 2 has departed from the point of departure becomes the information for the initial map data stored before traveling has begun.

The server 3 generates update information containing the update data of the current map data, and sends the update information to the vehicle 2 through the communication network 4 and macrocell base station 5 (step S106). When the update request is for updated information in any layer of the first layer to fourth layer of the map data, the server 3 may generate update information containing update data for the layer specified by the update request.

Using the update information sent from the server 3, the vehicle 2 updates the initial map data with update information representing information updated from the initial map data, among the information associated with the road zone in the update data that has been updated at the server 3 (step S107). The updated initial map data is used to control travel of the vehicle 2 in the road zone within the scheduled route. The map data update processing is repeated until the vehicle 2 reaches the destination.

The vehicle 2 will now be explained. As mentioned above, more than one vehicle 2 may be included in the map data updating system 1, but since each vehicle 2 has the same construction and conducts the same processing for map data update processing, the following explanation will assume a single vehicle 2.

Figure 4:
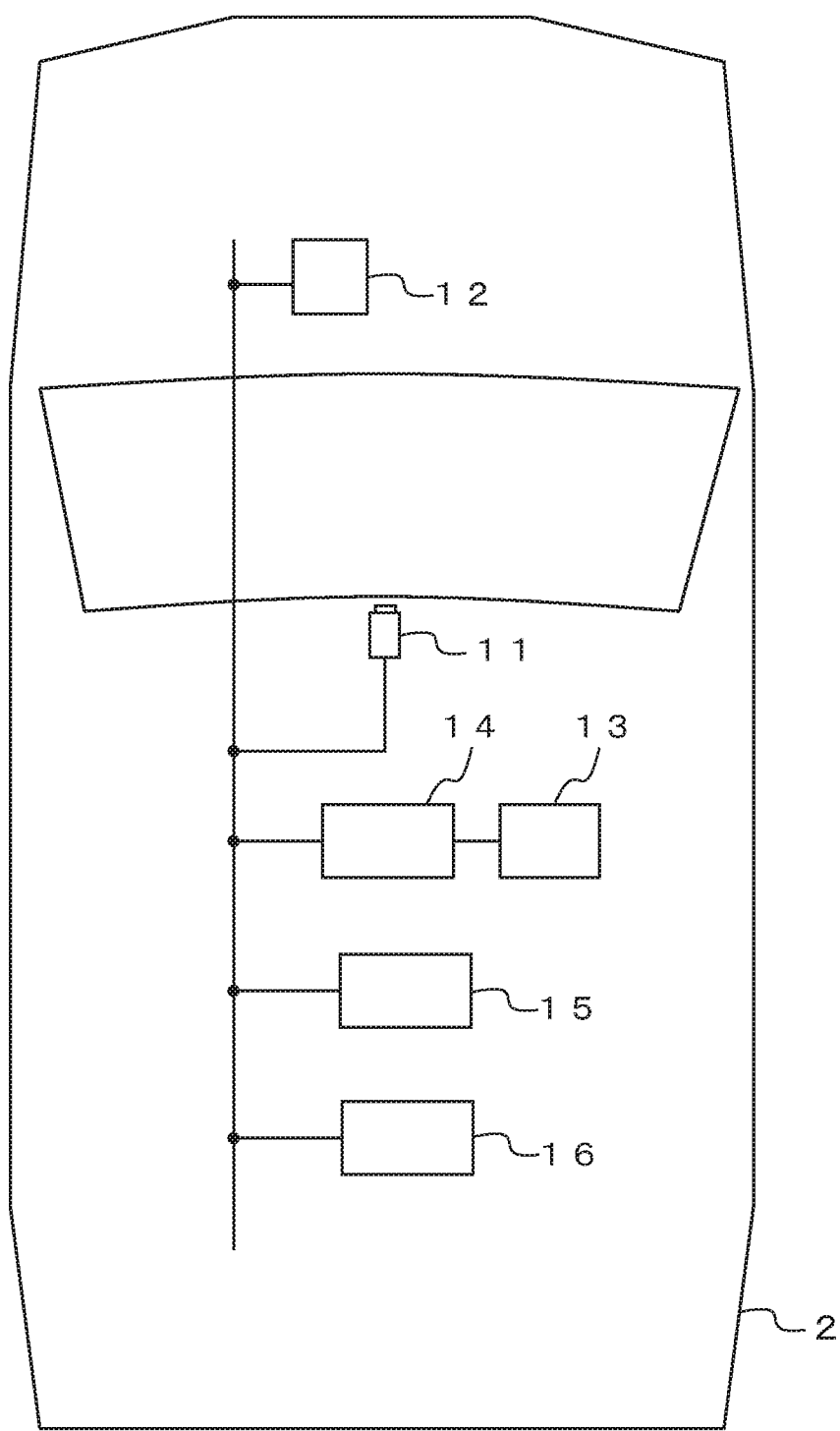
FIG. 4 is a general schematic drawing of a vehicle.

FIG. 4 is a general schematic drawing of the vehicle 2. The vehicle 2 comprises a camera 11 that photographs the environment in front of the vehicle 2, a wireless communication terminal 12, a positioning information receiver 13, a map data updating device 14 as an example of a map data updating device, a navigation device 15, and a vehicle control device 16. The vehicle 2 may also have a LIDAR sensor, as a distance sensor (not shown) for measurement of the distance of the vehicle 2 to surrounding objects.

The camera 11, wireless communication terminal 12, navigation device 15, vehicle control device 16 and map data updating device 14 are connected in a communicable manner through an in-vehicle network that conforms to controller area network standards.

The camera 11 is mounted inside the compartment of the vehicle 2 and directed toward the front of the vehicle 2. The camera 11 produces a camera image in which a predetermined region that is ahead of the vehicle 2 is shown at a camera image acquisition time set with a predetermined cycle. The camera image that is produced shows other vehicles around the vehicle 2, or road features such as road surface lane marking lines that are within the predetermined region ahead of the vehicle 2. The image produced by the camera 11 may be a color image or a gray image. The camera 11 is an example of an imaging unit, and it has a 2D detector composed of an array of photoelectric conversion elements with visible light sensitivity, such as a CCD or C-MOS, and an imaging optical system that forms an image of the photographed region on the 2D detector. The camera 11 outputs the camera image and the camera image acquisition time during which the camera image was produced, through the in-vehicle network to the vehicle control device 16 each time a camera image is produced. At the vehicle control device 16, the camera image is used for processing to estimate the current location of the vehicle, and for processing to detect any other objects around the vehicle 2.

The wireless communication terminal 12 is an example of a communication unit, being a device that carries out wireless communication processing conforming to a predetermined wireless communication standard, and for example, it accesses the macrocell base station 5 or small cell base station 6 to connect with the server 3 through the macrocell base station 5 and communication network 4 or the small cell base station 6 and communication network 4. The wireless communication terminal 12 also receives a downlink wireless signal including map data or update information, received from the server 3, and outputs the map data or update information to the map data updating device 14. The wireless communication terminal 12 further generates an uplink wireless signal that includes the map data request or update request received from the map data updating device 14. The wireless communication terminal 12 sends the uplink wireless signal to the macrocell base station 5 or small cell base station 6, thus sending the map data request or update request to the server 3. The wireless communication terminal 12 is a device that carries out wired communication processing according to a predetermined wired communication standard, and it is preferably connectable to the small cell base station 6 by wiring.

The positioning information receiver 13 outputs positioning information that represents the current location of the vehicle 2. The positioning information receiver 13 may be a GPS receiver, for example. The positioning information receiver 13 outputs positioning information and the positioning information acquisition time at which the positioning information has been acquired, to the map data updating device 14 each time positioning information is acquired at a predetermined receiving cycle.

The navigation device 15 produces a scheduled route from the current location of the vehicle 2 to the destination, based on navigating map data, the destination of the vehicle 2 and the current location of the vehicle 2. The navigation device 15 inputs positioning information and positioning information acquisition time output by the positioning information receiver 13, through the map data updating device 14, using it as the current location of the vehicle 2. Each time a scheduled route is produced, the navigation device 15 outputs the scheduled route to the vehicle control device 16 and map data updating device 14 through the in-vehicle network.

The vehicle control device 16 controls traveling of the vehicle 2. The vehicle control device 16 uses the positioning information, camera image and map information to estimate the current location of the vehicle. The vehicle control device 16 inputs positioning information and positioning information acquisition time output by the positioning information receiver 13, through the map data updating device 14. The vehicle control device 16 also inputs the map information including the current location of the vehicle 2, from the map data updating device 14. The vehicle control device 16 uses the camera image to detect other objects surrounding the vehicle 2. The vehicle control device 16 also generates an operation plan based on the current location of the vehicle 2, the scheduled route of the vehicle 2 and other objects surrounding the vehicle 2, and controls traveling of the vehicle 2 based on the operation plan.

Figure 5:
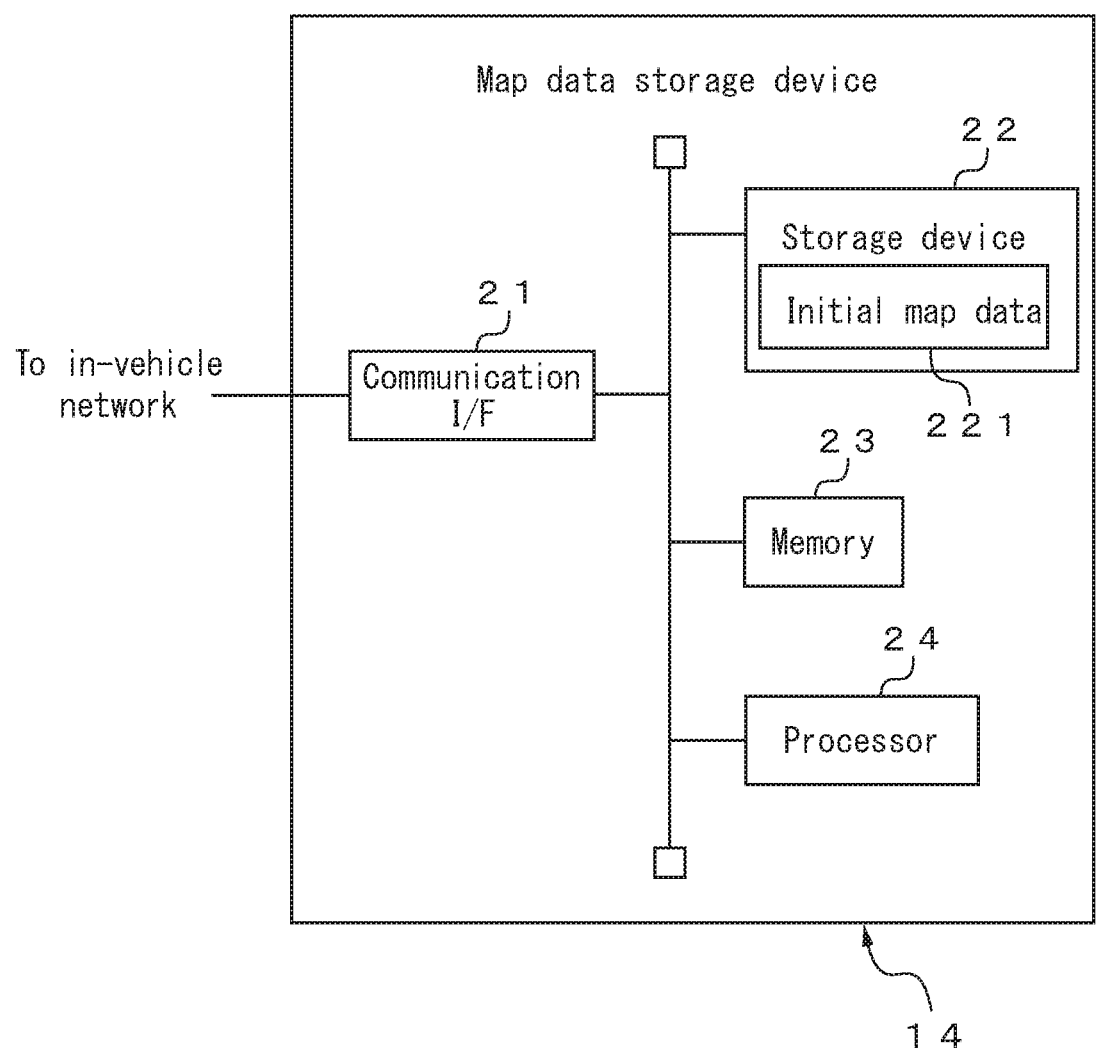
FIG. 5 is a hardware configuration diagram of a map data updating device.

FIG. 5 is a hardware configuration diagram of a map data updating device 14. The map data updating device 14 stores the map data received from the server 3 through the wireless communication terminal 12 before the vehicle 2 has begun traveling, as the initial map data. After the vehicle 2 has begun to travel along the scheduled route, for each of the plurality of road zones within the scheduled route, the map data updating device 14 sends, through the wireless communication terminal 12 to the server 3, a request for update information representing information that has been updated from the initial map data, among the information associated with the road zones in the map data updated at the server 3. The map data updating device 14 then updates the initial map data using the update information that has been received through the wireless communication terminal 12. Throughout the present specification, the initial map data that has been updated using the update information will be referred to as "updated initial map data". Also throughout the present specification, the initial map data that has been updated using the update information and the updated initial map data following the update will both be referred to simply as "updated initial map data". The map data updating device 14 refers to the initial map data or updated initial map data, based on positioning information, and generates map information for the region including the current location represented by the positioning information. For this purpose, the map data updating device 14 comprises a communication interface 21, a storage device 22, a memory 23 and a processor 24.

The communication interface (I/F) 21 is an example of an in-vehicle communication unit, and it has an interface circuit to connect the map data updating device 14 with the in-vehicle network. In other words, the communication interface 21 is connected with the wireless communication terminal 12, positioning information receiver 13, navigation device 15 and vehicle control device 16 through the in-vehicle network. Each time positioning information and positioning information acquisition time are received from the positioning information receiver 13, for example, the communication interface 21 passes the received positioning information and positioning information acquisition time to the processor 24. The communication interface 21 also passes the received scheduled route to the processor 24 each time it receives a scheduled route from the navigation device 15. The communication interface 21 sends the map data request and update request received from the processor 24 to the wireless communication terminal 12, through the in-vehicle network. The communication interface 21 further passes the map data and update information received from the wireless communication terminal 12, to the processor 24.

The storage device 22 is an example of a memory, and it comprises, for example, a hard disk device or optical recording medium, and a device for accessing it. The storage device 22 stores the map data received from the server 3 through the wireless communication terminal 12 before the vehicle 2 has begun traveling, as the initial map data 221. It also stores the initial map data 221 that has been updated by the processor 24.

The memory 23 is an example of a memory unit, and it has a volatile semiconductor memory and a non-volatile semiconductor memory, for example. The memory 23 stores an application computer program and data to be used for information processing carried out by the processor 24 of the map data updating device 14, and a vehicle ID for identification of the vehicle 2. The vehicle ID can be used to identify each vehicle 2 when the server 3 communicates with more than one vehicle 2, for example.

The processor 24 comprises one or more CPUs (Central Processing Units) and their peripheral circuits. The processor 24 may also have other computing circuits such as a logical operation unit, numerical calculation unit or graphic processing unit. When the processor 24 has multiple CPUs, it may have a separate memory for each CPU. The processor 24 generates a map data request before the vehicle 2 has begun to travel. After the vehicle 2 has begun to travel, the processor 24 carries out processing related to map data updating. The processor 24 also generates map information based on the positioning information.

Figure 6:
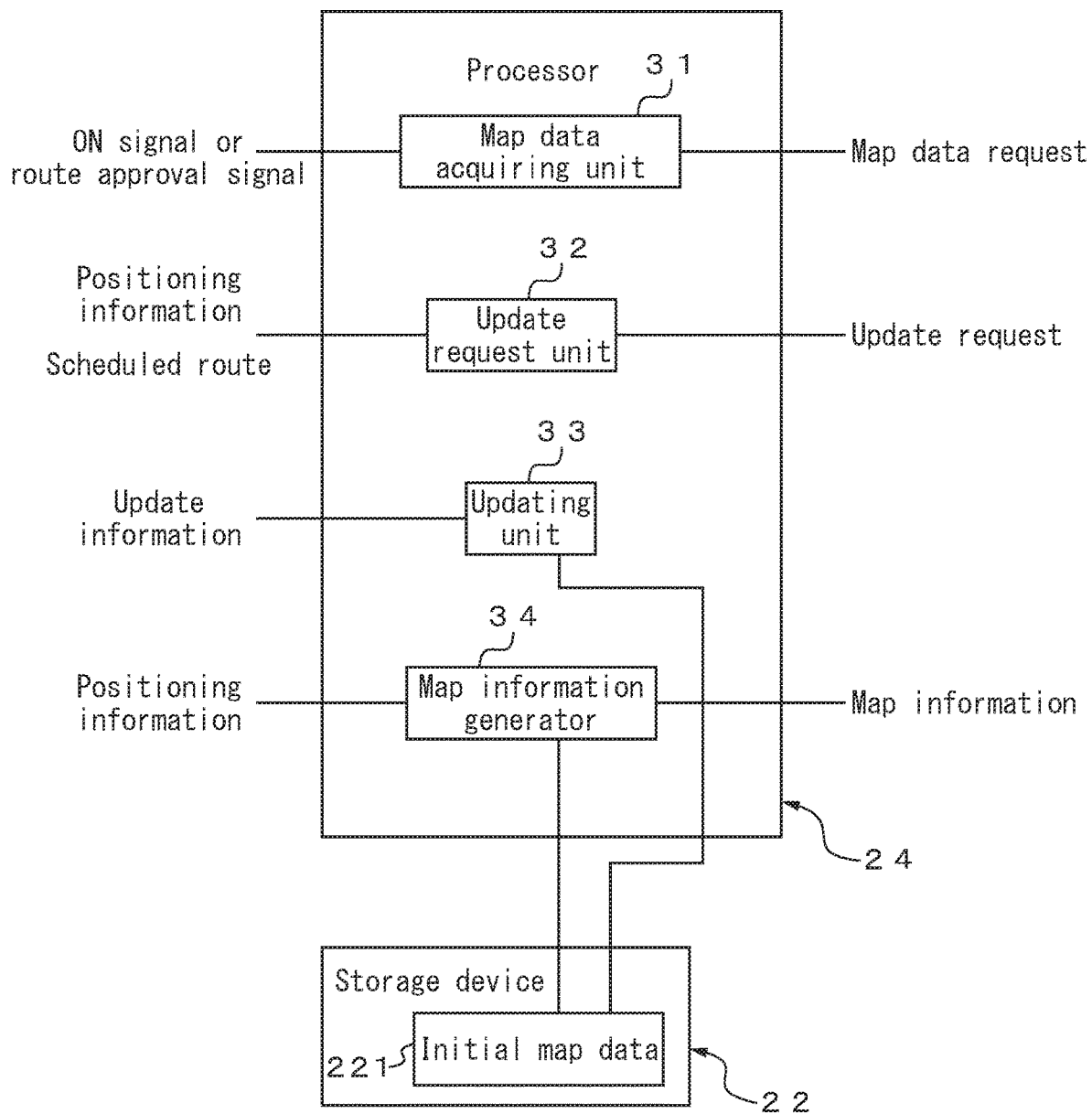
FIG. 6 is a functional block diagram of a processor in a map data updating device.

FIG. 6 is a functional block diagram of a processor 24 in a map data updating device 14. The processor 24 has a map data acquiring unit 31, an update request unit 32, an updating unit 33 and a map information generator 34. Each of the units of the processor 24 are functional modules driven by a computer program operating on the processor 24, for example. Alternatively, each of the units of the processor 24 may be specialized computing circuits in the processor 24.

Before the vehicle 2 has begun to travel, the map data acquiring unit 31 sends a map data request for map data through the wireless communication terminal 12, to the server 3 via the small cell base station 6 and communication network 4, using the communication interface 21. The map data acquiring unit 31 also stores map data received from the server 3 in the storage device 22, as initial map data 221. Throughout the present specification, the "period before the vehicle 2 begins to travel" does not mean that the vehicle 2 is only stopped, but rather that the map data updating device 14 is active and the vehicle 2 is in a state just prior to traveling. Through the communication interface 21, the map data acquiring unit 31 of the vehicle 2 receives an ON signal indicating that the ignition switch of the vehicle 2 is ON, and assesses that the vehicle 2 is in a state just prior to traveling. The map data acquiring unit 31 receives a route approval signal indicating the user's approval of the scheduled route generated by the navigation device 15 through the communication interface 21, and assesses that the vehicle 2 is in a state prior to traveling.

Figure 7:
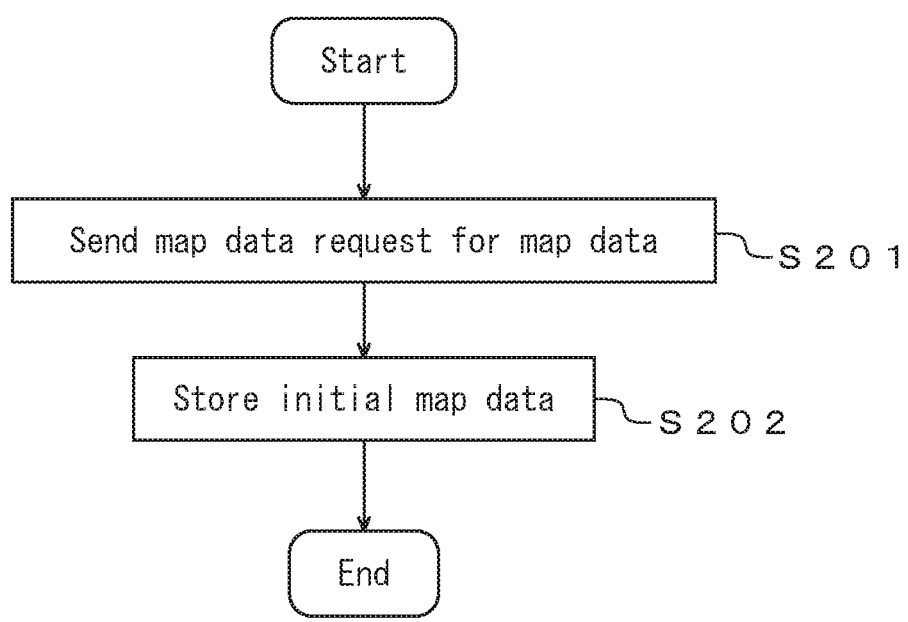
FIG. 7 is an operation flow chart for a map data acquiring unit in a processor of a map data updating device.

FIG. 7 is an operation flow chart for a map data acquiring unit 31 in a processor 24 of a map data updating device 14. First, the map data acquiring unit 31 sends a map data request for map data at the current time, through the communication interface 21 to the wireless communication terminal 12 (step S201). The wireless communication terminal 12 sends the map data request to the server 3, through the small cell base station 6 and communication network 4.

The map data acquiring unit 31 then stores map data received from the server 3 through the wireless communication terminal 12 in the storage device 22 as initial map data 221 (step S202). When the map data updating device 14 is already storing other initial map data or other updated initial map data, the other initial map data or other updated initial map data becomes the old map data, and the map data acquiring unit 31 therefore replaces the old initial map data with the new initial map data, storing it in the map data updating device 14.

After the vehicle 2 has begun to travel along the scheduled route, the update request unit 32 sends an update information request to the server 3 through the wireless communication terminal 12. The update request unit 32 acquires the current location of the vehicle 2 based on the positioning information, for example, and when the current location of the vehicle 2 has separated a predetermined distance from the departure point, it is assessed that the vehicle 2 has begun traveling along the scheduled route. The update request unit 32 may also obtain the current location of the vehicle 2 from the vehicle control device 16.

Figure 8:
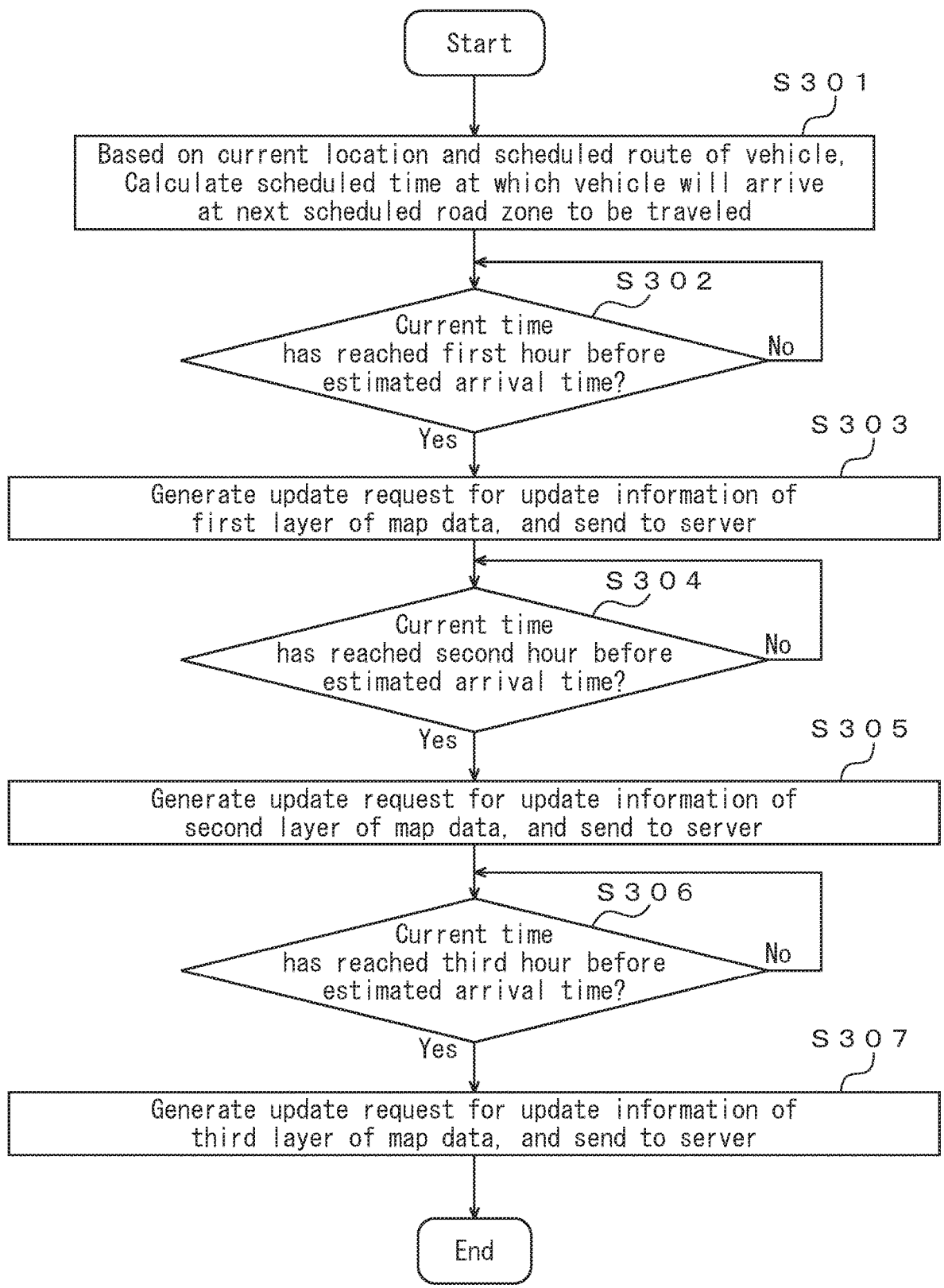
FIG. 8 is an operation flow chart for an update request unit in a processor of a map data updating device.
Figure 9:
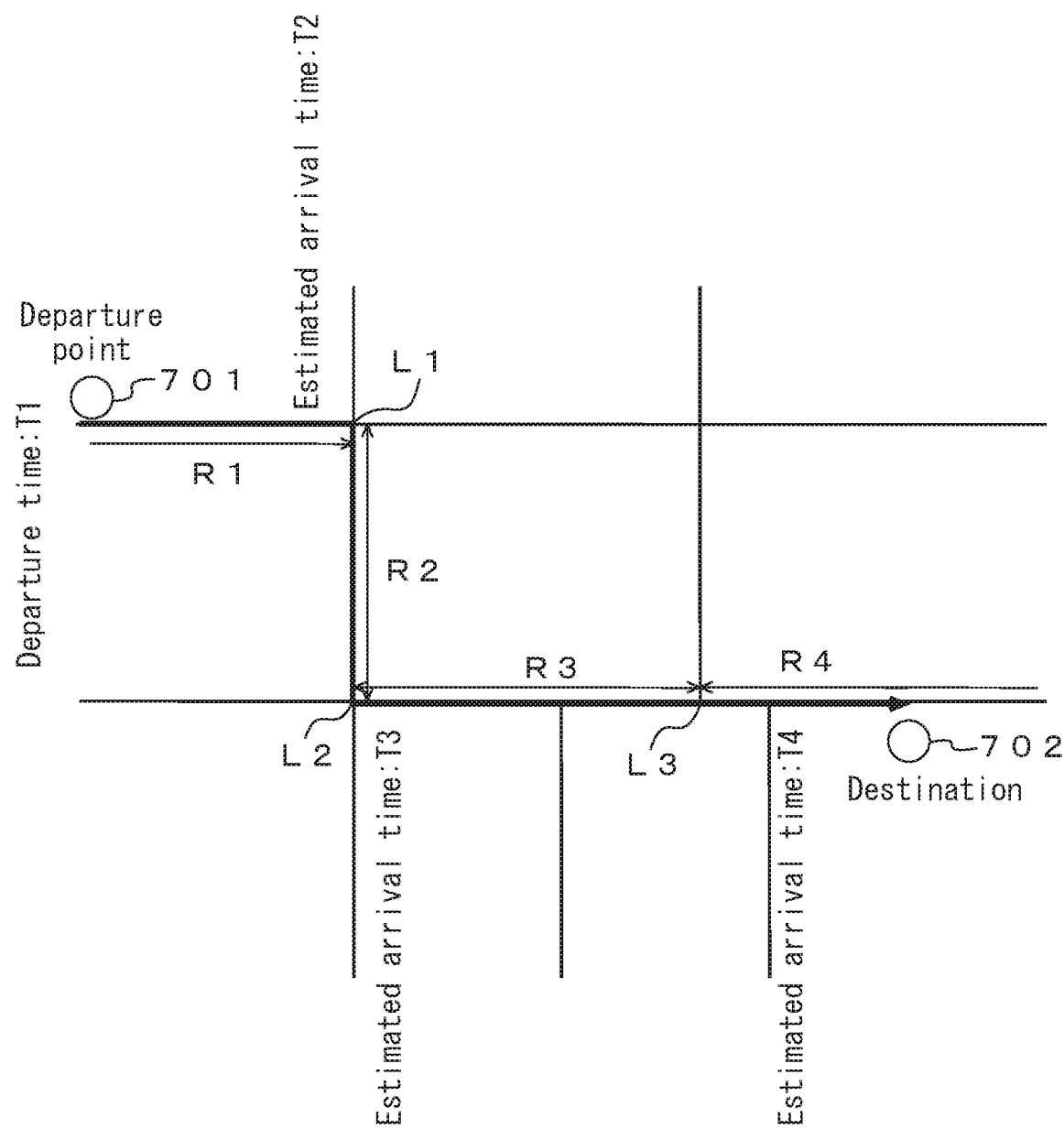
FIG. 9 is a diagram illustrating the scheduled route of a vehicle.

FIG. 8 is an operation flow chart for an update request unit 32 in a processor 24 of a map data updating device 14. FIG. 9 is a diagram illustrating the scheduled route of a vehicle 2. The scheduled route of the vehicle 2 includes a road zone R1 between the departure point 701 and a point L1, a road zone R2 between the point L1 and a point L2, a road zone R3 between the point L2 and a point L3, and a road zone R4 between the point L3 and a destination 702. The scheduled route is formed by linking the road zone R1, road zone R2, road zone R3 and road zone R4. After the vehicle 2 has begun to travel along the scheduled route, the update request unit 32 carries out the operation shown in FIG. 8, until it reaches the destination. Before the vehicle 2 reaches the road zone within the scheduled route, the update request unit 32 makes a request through the wireless communication terminal 12 to the server 3 for update information of the first layer associated with a certain road zone, before requesting for the update information of the second layer, third layer and fourth layer. First, based on the current location and scheduled route of the vehicle 2, the update request unit 32 calculates a scheduled arrival time at which the vehicle 2 will arrive at the next scheduled road zone to be traveled (hereunder also referred to as "next road zone") is to be reached (step S301). For example, during the period of departure from the departure point 701 at the departure time T1 and traveling in the road zone R1, the update request unit 32 r calculates a scheduled arrival time T2 at which the vehicle 2 is to arrive at the next scheduled traveling road zone R2 (point L1). The update request unit 32 receives the vehicle speed of the vehicle 2 through the communication interface 21, and calculates a scheduled arrival time T2 based on the average vehicle speed for a previous predetermined time and the distance between the current location of the vehicle 2 and point L1. Similarly, during the period of traveling in the road zone R2, the update request unit 32 calculates a scheduled arrival time T3 at which the vehicle 2 is to arrive at the next scheduled traveling road zone R3 (point L2). In addition, during the period of traveling in the road zone R3, the update request unit 32 calculates a scheduled arrival time T4 at which the vehicle 2 is to arrive at the next scheduled traveling road zone R4 (point L3). During traveling in the current road zone, the update request unit 32 may also calculate an estimated arrival time for arrival at 2, 3 or more road zones that are scheduled to be traveled.

The update request unit 32 then assesses whether or not the current time is before the first time period with respect to the estimated arrival time of the vehicle 2 to the next road zone (step S302). If the current time is within the first time period with respect to the estimated arrival time of the vehicle 2 to the next road zone (step S302-Yes), then the update request unit 32 generates an update request including information representing the first layer of the map data and the road zone ID representing the next road zone. While traveling in the road zone R1, for example, the update request unit 32 assesses whether or not it is before the first time period with respect to the estimated arrival time to the road zone R2. If the current time is before the first time period with respect to the estimated arrival time of the vehicle 2 to the next road zone, the update request unit 32 generates an update request for the next road zone, requesting update information of the first layer of the initial map data 221 associated with the next road zone, among the information associated with the next road zone in the map data updated at the server 3, and uses the wireless communication terminal 12 to send the update request to the server 3 through the macrocell base station 5 and communication network 4 (step S303). The information of the first layer in the map data is static information relating to conditions that essentially do not change. The information of the first layer of the map data is therefore estimated to be mostly unchanged both at the time just before the vehicle 2 reaches the next road zone and the time relatively ahead of time. The first time period may be 1 hour, for example. When it has been assessed that the current time is not before the first time period with respect to the estimated arrival time to the next road zone (step S302-No), the map data acquiring unit 31 carries out assessment for step S302, at a predetermined time interval.

The update request unit 32 then assesses whether or not the current time is before a second time period that is shorter than the first time period with respect to the estimated arrival time of the vehicle 2 to the next road zone (step S304). If the current time is within the second time period with respect to the estimated arrival time of the vehicle 2 to the next road zone (step S304-Yes), then the update request unit 32 generates an update request including information representing the second layer of the map data and the road zone ID representing the next road zone. While traveling in the road zone R1, for example, the update request unit 32 assesses whether or not it is before the second time period with respect to the estimated arrival time to the road zone R2. If the current time is before the second time period with respect to the estimated arrival time of the vehicle 2 to the next road zone, the update request unit 32 generates an update request for the next road zone, requesting update information of the second layer of the initial map data 221 associated with the next road zone, among the information associated with the next road zone in the map data updated at the server 3, and uses the wireless communication terminal 12 to send the update request to the server 3 through the macrocell base station 5 and communication network 4 (step S305). The information of the second layer of the map data is semi-static information, being information relating to conditions that continue for certain periods but can potentially vary in a shorter time period than static information. The information of the second layer of the map data is therefore estimated to be largely unchanged both at the time just before the vehicle 2 reaches the next road zone and the time relatively ahead of time. An example of the second time period is 30 minutes to 1 hour, or within the update cycle of the first layer at the server 3. When it has been assessed that the current time is not before the second time period with respect to the estimated arrival time to the next road zone (step S304-No), the map data acquiring unit 31 carries out assessment for step S304, at a predetermined time interval.

The update request unit 32 then assesses whether or not the current time is before a third time period that is shorter than the second time period with respect to the estimated arrival time of the vehicle 2 to the next road zone (step S306). If the current time is within the third time period with respect to the estimated arrival time of the vehicle 2 to the next road zone (step S306-Yes), then the update request unit 32 generates an update request including information representing the third layer of the map data and the road zone ID representing the next road zone. While traveling in the road zone R1, for example, the update request unit 32 assesses whether or not it is before the third time period with respect to the estimated arrival time to the road zone R2. If the current time is before the third time period with respect to the estimated arrival time of the vehicle 2 to the next road zone, the update request unit 32 generates an update request for the next road zone, requesting update information of the third layer of the initial map data 221 associated with the next road zone, among the information associated with the next road zone in the map data updated at the server 3, and uses the wireless communication terminal 12 to send the update request to the server 3 through the macrocell base station 5 and communication network 4 (step S307). The information of the third layer of the map data is semi-dynamic information, being information relating to conditions that can potentially vary in a shorter time period than semi-static information. The information of the third layer of the map data is therefore estimated to be changeable between the time just before the vehicle 2 reaches the next road zone and the time relatively ahead of that time. An example of the third time period is 1 to 30 minutes, within the update cycle of the second layer at the server 3. When it has been assessed that the current time is not before the third time period with respect to the estimated arrival time to the next road zone (step S306-No), the map data acquiring unit 31 carries out assessment for step S306, at a predetermined time interval. For the road zone in which the vehicle 2 is currently traveling (hereunder also referred to as current road zone), the update request unit 32 may send, through the wireless communication terminal 12 to the server 3, an update request for update information of the third layer of the initial map data 221 that is associated with the current road zone, among the information of the updated map data associated with the current road zone. As mentioned above, the information of the third layer of the map data is semi-dynamic information, and therefore the map data acquiring unit 31 preferably carries out constant updating of the information of the third layer of the map data, for the road zone currently being traveled.

At a predetermined time interval (for example, one minute within the update cycle of the third layer at the server 3), the update request unit 32 generates an update request for the current road zone in which the vehicle 2 is currently traveling, requesting update information of the fourth layer of the initial map data 221 associated with the current road zone, among the information associated with the current road zone in the map data updated at the server 3, and uses the wireless communication terminal 12 to send the update request to the server 3 through the macrocell base station 5 and communication network 4. The information of the fourth layer of the map data is dynamic information, being information relating to conditions that can potentially vary in real time. Therefore, the update request unit 32 preferably carries out constant updating of information of the fourth layer of the map data for the road zone that is currently being traveled.

The updating unit 33 uses the update information received through the wireless communication terminal 12 to update the initial map data 221, in regard to the road zone for which update information was requested among the plurality of road zones within the scheduled route. For the purpose of the present specification, updating of the initial map data 221 by the updating unit 33 using the update information also includes updating by the updating unit 33 of the initial map data that has been updated using the update information 221.

Figure 10:
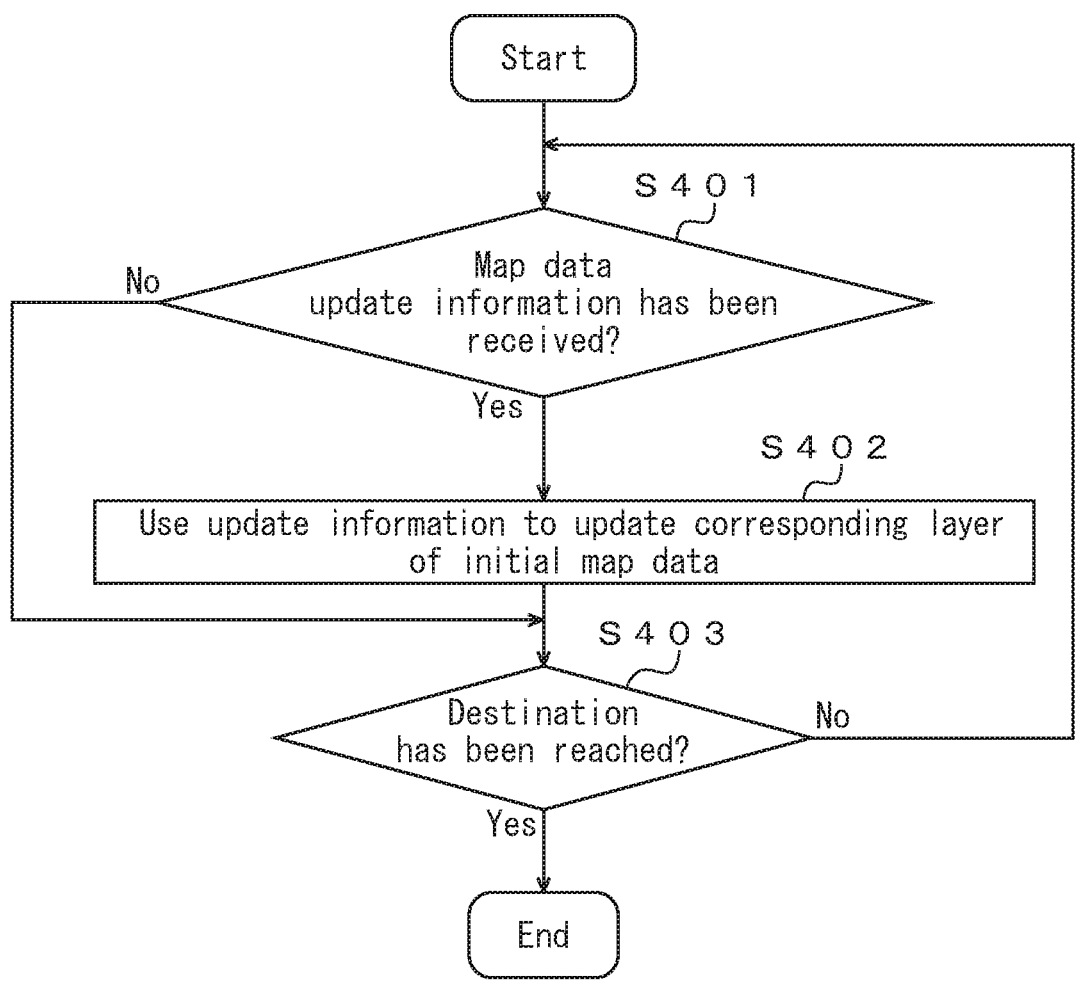
FIG. 10 is an operation flow chart for an updating unit in a processor of a map data updating device.

FIG. 10 is an operation flow chart for an updating unit 33 in a processor 24 of a map data updating device 14. The updating unit 33 uses the update information received through the wireless communication terminal 12 to update the initial map data 221 received before the vehicle 2 has begun to travel. First, the updating unit 33 assesses whether or not update information for the map data has been received from the server 3 through the wireless communication terminal 12 (step S401). As mentioned above, when the update request is for updated information of any layer from among the first layer to fourth layer of the map data, the server 3 generates update information that includes information relating to the road zone specified by the update request among the update data for the layer specified by the update request, information representing the layer specified by the update request, and the road zone ID specified by the update request. The update information includes information only for the road zone specified by the update request, from among the update data of the layer specified by the update request. When update information for the map data is being received (step S401-Yes), the updating unit 33 uses the received update information to update the initial map data 221 for the road zone identified by the road zone ID in the update information, in the layer specified by the update information, among the information associated with the road zone in the update data from the map data updated at the server 3 (step S402). In the updated initial map data 221, therefore, the information associated with the road zone of the layer updated using the update information matches the information of the map data updated at the server 3. For example, when the update information indicates a change in location or type of road markings associated with a certain road zone of the first layer in the map data, the updating unit 33 uses the update information to update the information for that road zone in the first layer of the initial map data 221. When the update information indicates a change in information relating to traffic regulations associated with a certain road zone of the second layer in the map data, the updating unit 33 uses the update information to update the information for that road zone in the second layer of the initial map data 221. When the update information indicates a change in information relating to traffic congestion associated with a certain road zone of the third layer in the map data, the updating unit 33 uses the update information to update the information for that road zone in the third layer of the initial map data 221. When the update information indicates a change in information relating to vehicle location or type associated with a certain road zone of the fourth layer in the map data, the updating unit 33 uses the update information to update the information for that road zone in the fourth layer of the initial map data 221. When map data update information is not being received, on the other hand (step S401-No), the updating unit 33 assesses whether or not the vehicle 2 has reached the destination. For example, the updating unit 33 assesses whether or not the vehicle 2 has reached the destination based on the current location of the vehicle 2 and the scheduled route. When the vehicle 2 has reached the destination (step S403-Yes), operation of the map data updating device 14 is completed. When the vehicle 2 has not reached the destination, on the other hand (step S403-No), the updating unit 33 carries out the assessment of step S401 for a predetermined time interval.

With reference to the initial map data 221 or updated initial map data 221 stored in the storage device 22, the map information generator 34 outputs the map information for a relatively narrow area including the current location represented by the positioning information (for example, an area of 100 square m to 10 square km), the positioning information and the positioning information acquisition time via the in-vehicle network to the vehicle control device 16, each time positioning information is input from the positioning information receiver 13. The map information storage device 14 outputs the positioning information and positioning information acquisition time through the in-vehicle network to the navigation device 15, each time positioning information is input from the positioning information receiver 13.

Figure 11:
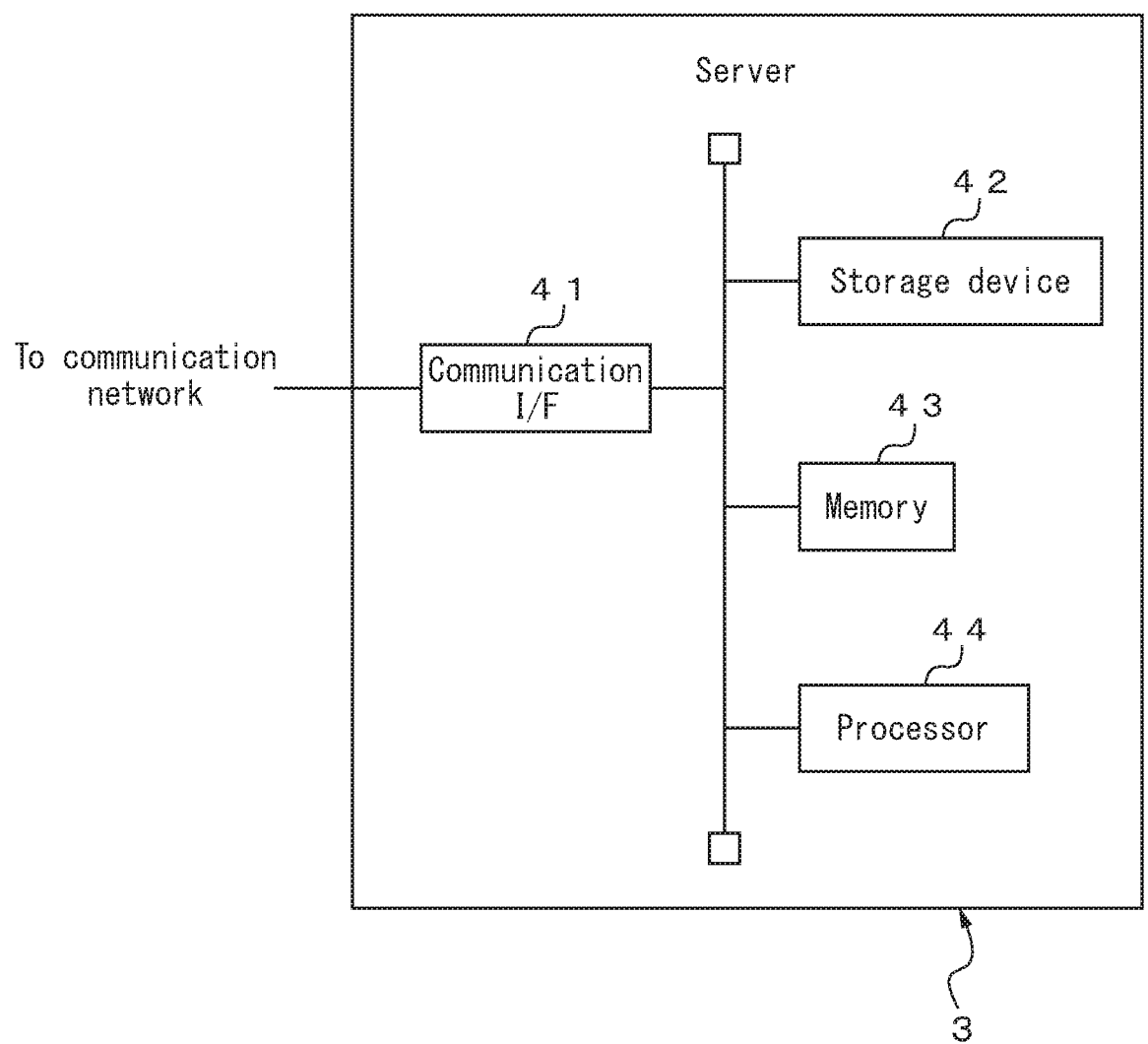
FIG. 11 is a hardware configuration diagram of a server.

FIG. 11 is a hardware configuration diagram of a server 3. The server 3 comprises a communication interface 41, a storage device 42, a memory 43 and a processor 44. The communication interface 41, storage device 42 and memory 43 are connected with the processor 44 by signal wires. The server 3 may also comprise an input device such as a keyboard and mouse, and a display device such as a liquid crystal display.

The communication interface 41 is an example of a communication unit, and it has an interface circuit to connect the server 3 with the communication network 4. The communication interface 41 is configured to be able to communicate with the vehicle 2 through the communication network 4, macrocell base station 5 or small cell base station 6. Specifically, the communication interface 41 passes map data requests and update requests received from the vehicle 2 through the macrocell base station 5 or small cell base station 6 and the communication network 4, to the processor 44. The communication interface 41 also sends map data and update information received from the processor 44, to the vehicle 2 through the communication network 4 and macrocell base station 5 or small cell base station 6.

The storage device 42 is an example of a memory, and it comprises, for example, a hard disk device or optical recording medium, and a device for accessing it. The storage device 42 stores the map data that has been updated by the processor 44. The map data has the hierarchical structure shown in FIG. 3. The server 3 collects road-related information through the communication network 4, and updates information for each layer of the map data. For example, at the server 3, the first layer is updated every hour, the second layer is updated every 30 minutes to 1 hour, the third layer is updated every 1 to 30 minutes and the fourth layer is updated every 1 to 30 minutes. The storage device 42 may also store map data updated by another server. The storage device 42 may additionally store the vehicle ID of the vehicle 2. The storage device 42 may further store a computer program for carrying out server 3 processing related to map data update processing, which is carried out in the processor 44.

The memory 43 is another example of a memory unit, and it has a non-volatile semiconductor memory and a volatile semiconductor memory, for example. The memory 43 transiently stores data generated during the server 3 related processing among the map data update processing, and data acquired by communication with the vehicle 2, such as update requests and update information.

The processor 44 is an example of a controller, and it comprises one or more CPUs (Central Processing Units) and their peripheral circuits. The processor 44 may also have other computing circuits such as a logical operation unit or numerical calculation unit. The processor 44 carries out processing related to the server 3, among the map data update processing.

Figure 12:
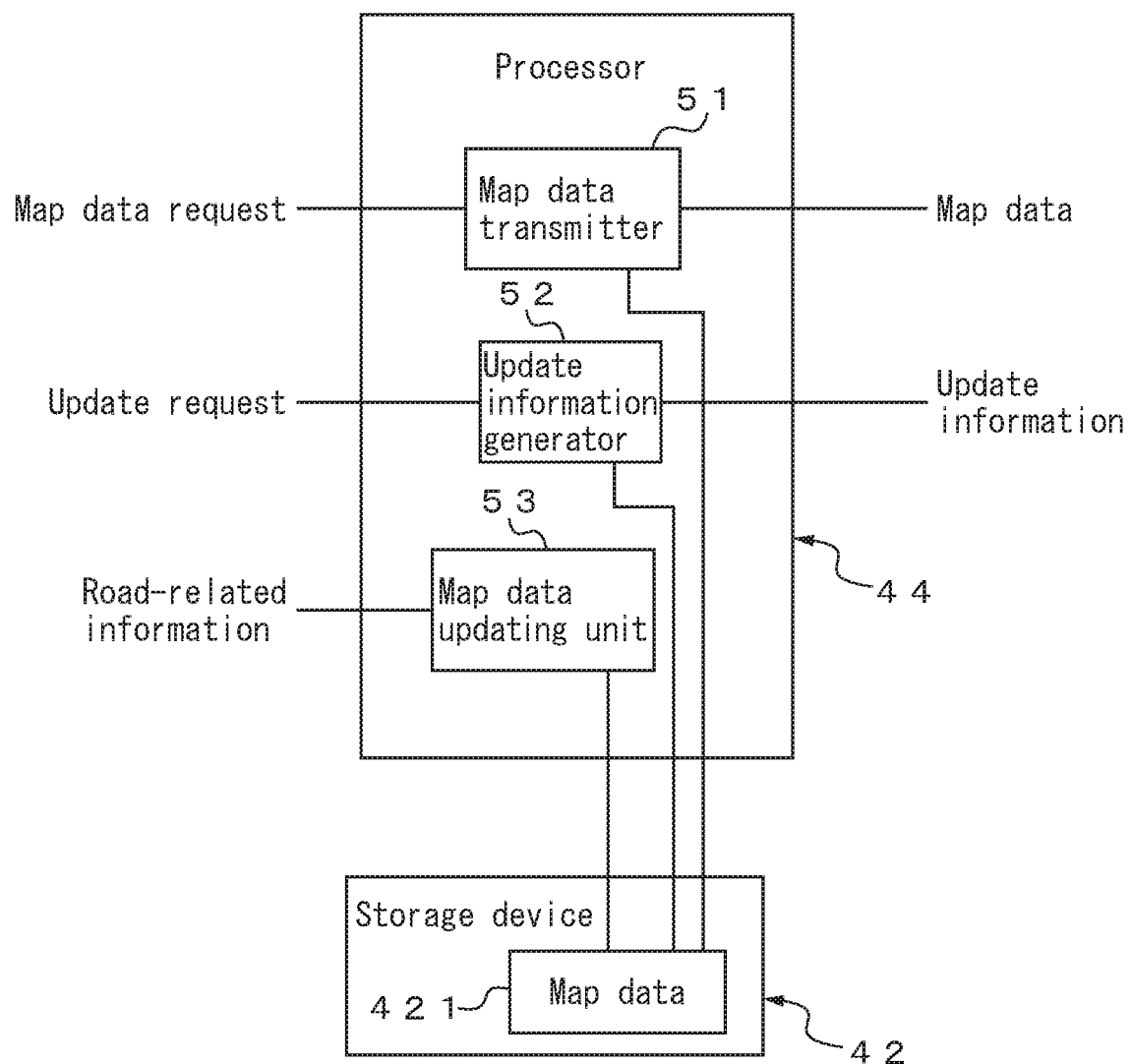
FIG. 12 is a functional block diagram of a processor in a server.

FIG. 12 is a functional block diagram of a processor 44 in a server 3. The processor 44 has a map data transmitter 51, an update information generator 52 and a map data updating unit 53. Each of the units of the processor 44 are functional modules driven by a computer program operating on the processor 44, for example. Alternatively, each of the units of the processor 44 may be specialized computing circuits in the processor 44.

When the map data transmitter 51 receives a map data request from the vehicle 2, it reads the map data 421 (basic data and update data) from the storage device 42, and sends the map data to the vehicle 2 through the communication network 4 and macrocell base station 5 using the communication interface 41.

Figure 13:
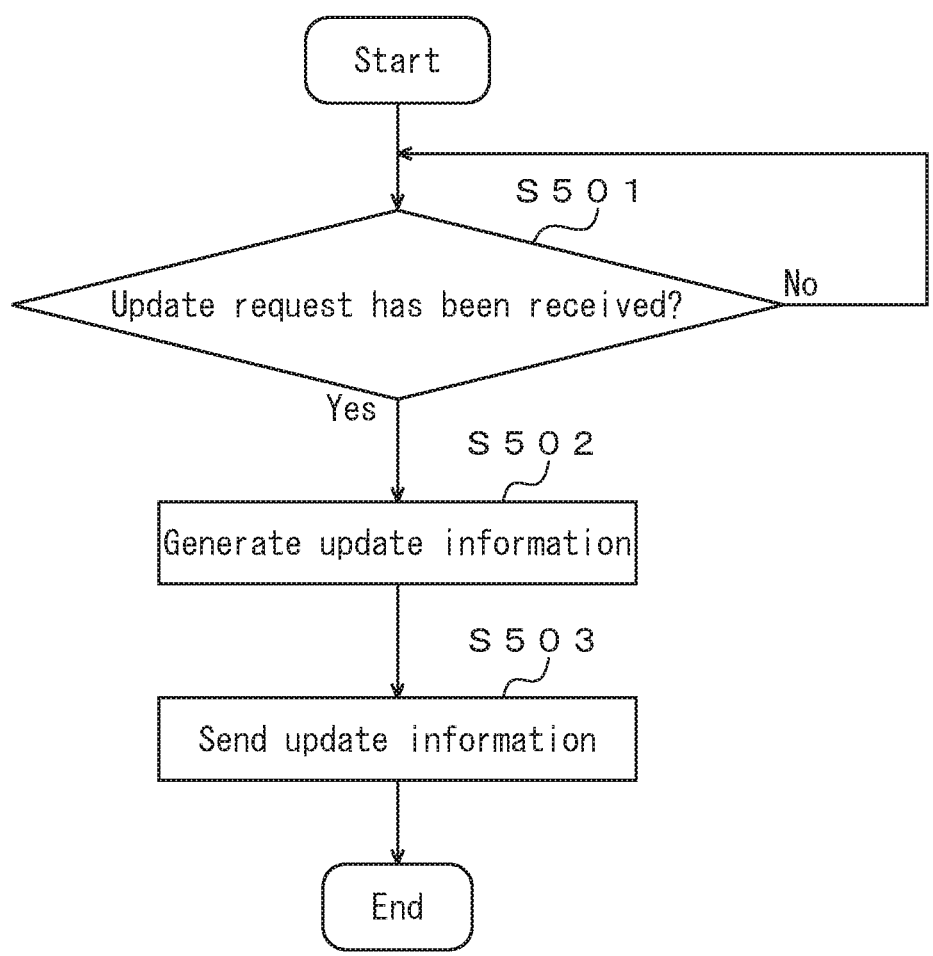
FIG. 13 is an operation flow chart for the processing carried out at an update information generator of a server during map data update processing.

FIG. 13 is an operation flow chart for the processing carried out at an update information generator 52 of a server during map data update processing. First, the update information generator 52 assesses whether or not an update request has been received (step S501). When an update request has been received (step S501-Yes), the update information generator 52 refers to the map data 421 stored in the storage device 42, to generate update information containing only information relating to the road zone specified by the update request, among the update data for the layer specified by the update request (step S502). That is, the update information does not include information for layers other than the layer specified by the update request, and does not include information relating to road zones other than the road zone specified by the update request, for the layer specified by the update request. The update information generator 52 then adds the information representing the layer specified by the update request and the road zone ID to the update information, and uses the communication interface 41 to send the update information to the vehicle 2 through the communication network 4 and macrocell base station 5 or small cell base station 6 (step S503).

The map data updating unit 53 collects the road-related information as appropriate, and updates the map data 421 stored in the storage device 42. The map data updating unit 53 classifies the road-related information collected through the communication network 4 via the communication interface 41, into each respective layer, and updates the update data of the map data 421 so that the information classified for each layer in the update cycle is associated with the traffic lane ID of the corresponding layer. The map data updating unit 53 also updates the basic data using the update data, at a longer update cycle than the update cycle for each layer, and generates new basic data.

As already explained above, the map data updating device stores map data received from the server before the vehicle has begun to travel as initial map data, and after the vehicle has begun to travel along the scheduled route, for each of the plurality of road zones within the scheduled route, it sends to the server a request for update information representing information that has been updated from the initial map data, among the information associated with the road zones in the map data updated at the server. The map data updating device then updates the initial map data using the received update information. Thus, after the vehicle has begun to travel, the map data updating device receives only the update information of the map data that is associated with the road zone in the scheduled route, thereby updating the map data related to the scheduled route to the new state while also reducing the communication load and communication cost.

A modified example of the map data updating system described above will now be explained. For the modified example, each of the items of information of the map data is associated at the server 3 with an updating date/time at which the information has been updated. The server 3 carries out processing related to updating the map data, using the updating date/time for each of the items of information of the map data. In response to the map data request received from the vehicle 2, the server 3 sends to the vehicle 2 the map data and the send date/time representing the time at which the map data was sent to the vehicle 2. The storage device 22 of the map data updating device of the vehicle 2 stores the map data received from the server 3 as initial map data before traveling begins, while also storing the send date/time of the map data received from the server 3, as the send date/time of the initial map data. This is stored together with the initial map data. When a request has been made to the server 3 for update information of the map data, the update request unit of the map data updating device of the vehicle 2 sends the update information containing the road zone ID and the send date/time of the initial map data to the server through the communication unit. In response, the server 3 generates update information containing information that has been updated after the send date/time of the initial map data, among the information associated with the road zone in the map data that has been updated at the server 3, and sends it to the vehicle 2. The updating unit of the map data updating device of the vehicle 2 updates the initial map data using update information containing information that has been updated after the send date/time of the initial map data, among the information associated with the road zone of the map data that has been updated at the server 3, for the road zone for which update information has been requested, among each of the plurality of road zones within the scheduled route. The update processing of the map data may also be carried out for each layer of the map data.

The map data updating device and computer program for map data updating according to the embodiment described above may incorporate appropriate modifications that are still within the gist of the invention. Moreover, the technical scope of the invention is not limited to this embodiment, and includes the invention and its equivalents as laid out in the Claims.

For example, the map data updating device of the invention was described as being installed in a vehicle, but the map data updating device may instead be installed in a moving object other than a vehicle, or installed in a portable terminal.

Also, the map data in the embodiment described above had first to fourth layers, but the map data does not need to have the information classified into first to fourth layers. The update processing of the map data may also be carried out for the map data as a whole, instead of for each layer.

The invention claimed is:

1. A map data updating device comprising:
a communication unit;
a memory; and
a processor configured
  to store map data received from a server through the communication unit before the vehicle has begun to travel in the memory as initial map data,
  to send a request to the server through the communication unit for update information representing information updated from the initial map data for each of a plurality of road zones within a scheduled route, from among the information associated with the road zones in the map data updated at the server, after the vehicle has begun to travel along the scheduled route, and
  to use the updated information received through the communication unit to update the initial map data;
wherein the map data comprises:
first layer data comprising static information, the processor being configured to update the first layer data at a first interval;
second layer data comprising semi-static information, the processor being configured to update the second layer data at a second interval that is shorter than the first interval;
third layer data comprising semi-dynamic information, the processor being configured to update the third layer data at a third interview that is shorter than the second interval; and
fourth layer data comprising dynamic information, the processor being configured to update the fourth layer data at a fourth interval that is shorter than the third interval; and
wherein the processor is further configured to generate the request such that the request includes a request for different layer data selected among the first to fourth layer data based on a time until the vehicle reaches a next road zone or a destination.

2. The map data updating device according to claim 1, wherein the map data comprises first map data which information is updated at the server at a first update cycle and second map data which information is updated at the server at a second update cycle that is shorter than the first update cycle, and the processor is configured to send a request to the server through the communication unit for the update information of the first map data associated with the road zone before requesting for the update information of the second map data for each of a plurality of road zones within the scheduled route, before the vehicle has reached the road zone.

3. The map data updating device according to claim 1, wherein the map data comprises basic data and update data which has updated information with respect to the basic data, and the processor is configured to update the initial map data using the update information that represents the information updated from the initial map data, among the information associated with the road zone in the update data that has been updated at the server, for the road zone for which the update information has been requested among each of a plurality of road zones within the scheduled route.

4. The map data updating device according to claim 1, wherein each of the items of information of the map data is associated with an updating date/time at which the information was updated, the processor is configured to store the send date/time at which the server sent the map data to the vehicle, as the send date/time for the initial map data, in the memory together with the initial map data, the processor is configured to send the send date/time for the initial map data to the server through the communication unit, together with the request for the update information, and the processor is configured to update the initial map data using the update information containing information updated after the send date/time for the initial map data, among the information associated with the road zone of the map data that has been updated at the server, for the road zone for which update information was requested, among each of a plurality of road zones within the scheduled route.

5. A computer-readable non-transitory storage medium that stores a computer program for location estimation, wherein the computer program causes a processor to store map data received from a server through the communication unit before the vehicle has begun to travel in the memory as initial map data, to send a request to the server through the communication unit for update information representing information updated from the initial map data for each of a plurality of road zones within a scheduled route, from among the information associated with the road zones in the map data updated at the server, after the vehicle has begun to travel along the scheduled route, and to use the updated information received through the communication unit to update the initial map data;

wherein the map data comprises:

first layer data comprising static information, the computer program causing the processor to update the first layer data at a first interval;

second layer data comprising semi-static information, the computer program causing the processor to update the second layer data at a second interval that is shorter than the first interval;

third layer data comprising semi-dynamic information, the computer program causing the processor to update the third layer data at a third interview that is shorter than the second interval; and fourth layer data comprising dynamic information, the computer program causing the processor to update the fourth layer data at a fourth interval that is shorter than the third interval;

wherein the computer program causes the processor to generate the request such that the request includes a request for different layer data selected among the first to fourth layer data based on a time until the vehicle reaches a next road zone or a destination.

* * * * *